(12) United States Patent
Son

(10) Patent No.: US 7,802,904 B2
(45) Date of Patent: Sep. 28, 2010

(54) ELECTRONIC STROBOSCOPE

(75) Inventor: Young-bae Son, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 742 days.

(21) Appl. No.: 11/699,157

(22) Filed: Jan. 26, 2007

(65) Prior Publication Data

US 2007/0280661 A1 Dec. 6, 2007

(30) Foreign Application Priority Data

Jun. 5, 2006 (KR) ...................... 10-2006-0050474

(51) Int. Cl.
*F21V 7/00* (2006.01)
(52) U.S. Cl. ..................... 362/297; 362/346
(58) Field of Classification Search ................ 362/261, 362/263, 296.01, 296.06, 296.07, 296.08, 362/297, 298, 302, 304, 341, 346, 347, 350; 396/200; 359/868, 869
See application file for complete search history.

(56) References Cited

U.S. PATENT DOCUMENTS 7,234,845 B2 * 6/2007 Ishino et al. ................ 362/297

FOREIGN PATENT DOCUMENTS

| JP | 09-166815 A | 6/1997 |
| JP | 09-197497 A | 7/1997 |
| JP | 2004-212926 A | 7/2004 |
| KR | 2005-0074597 A | 7/2005 |

* cited by examiner

*Primary Examiner*—Hargobind S Sawhney
(74) *Attorney, Agent, or Firm*—Drinker Biddle & Reath LLP

(57) ABSTRACT

An electronic stroboscope including a generally longitudinal light discharge tube and a reflector comprising a first reflecting part which reflects light radiated from the light discharge tube and a second reflecting part which reflects light directly radiated from the light discharge tube and light reflected from the first reflecting part to exit out of an opening. The first reflecting part includes first curved parts formed on an opposite side of the light discharge tube from the opening, planar parts connected to the first curved parts and disposed closer to the opening than the first curved parts, and circular parts connected to the planar parts and disposed closer to the opening than the planar parts, and the second reflecting part includes second curved parts connected to the circular parts of the first reflecting parts and disposed closer to the opening than the first curved parts.

17 Claims, 3 Drawing Sheets

ELECTRONIC STROBOSCOPE

CROSS-REFERENCE TO RELATED PATENT APPLICATION

This application claims the benefit of Korean Patent Application No. 10-2006-0050474, filed on Jun. 5, 2006, in the Korean Intellectual Property Office, the disclosure of which is incorporated herein in its entirety by reference.

BACKGROUND OF THE INVENTION

1. Field of the Invention

The present invention relates to an electronic stroboscope, and more particularly, to an electronic stroboscope including a reflector that reflects light generated from a light discharge tube that can be used in a compact and slim digital camera in order to irradiate it uniformly towards a subject.

2. Description of the Related Art

An electronic stroboscope includes a light discharge tube and a reflector, the light discharge tube having a light source. The reflector reflects light generated by the light source from the light discharge tube and irradiates it uniformly onto a front surface of a subject.

As digital cameras have gradually become compact and slim, users demand both camera design and camera performance when selecting cameras. To satisfy these requirements, a reflector of an electronic stroboscope should be designed to be thin and to have a narrow opening while having desired light distribution properties. In order for cameras to become more slim and compact, the reflector should become thinner and an opening of the reflector should become narrower.

Japanese Patent Laid-Open Gazette No. 1997-166815, Japanese Patent Publication Gazette No. 3672990, Japanese Patent Laid-Open Gazette No. 19970197497, and Korean Patent Laid-Open Gazette No. 2005-0074597 each discloses a reflector of an electronic stroboscope. However, these publications focus on improving light distribution; miniaturization and slim design of the electronic stroboscope are not addressed. That is, an opening of the reflector is wide and an angle of light distribution is not considered. Accordingly, in order for light radiated from the light discharge tube to reach a maximum angle of light distribution, the depth of the reflector (i.e., a length of the reflector in a thickness direction of a camera) should be increased. Therefore, conventional reflectors make miniaturization and slim of a camera difficult. In addition, although the angle of light distribution can be reduced using a protector, there is a limit in the amount to which the angle can be reduced. Also, the radiation efficiency is decreased due to light being radiated out of the angle of light distribution.

In particular, the reflector disclosed in Korean Patent Laid-Open Gazette No. 2005-0074597 includes an aspheric part, a cylindrical curved part, a periplanar part, and an inclined planar part. The radius of curvature of the cylindrical curved part is very short (about 0.95-1.1 mm) and thus, the inclined planar part having a short length is hard to manufacture since the manufacture process includes compressing a thin plate formed of aluminum material. Also, light distribution in a vertical direction varies much with the inclination of the inclined planar part.

SUMMARY OF THE INVENTION

The present invention provides an electronic stroboscope which is compact and slim and has excellent light distribution properties, such as light radiation efficiency, realized by optimizing the shape of a first reflecting part of a reflector of the electronic stroboscope.

According to an aspect of the present invention, there is provided an electronic stroboscope including: a light discharge tube arranged in a longitudinal direction and radiating light in all directions from an outer surface thereof; and a reflector in which the light discharge tube is disposed, the reflector comprising a first reflecting part that reflects light radiated from the light discharge tube and a second reflecting part that reflects light directly radiated from the light discharge tube and light reflected at the first reflecting part to exit out of an opening of the reflector.

An X-axis is defined as an axis extending parallel to the opening from the center of the light discharge tube as viewed in a side cross-section including the light discharge tube and the reflector and a Y-axis is defined as an axis passing through the center of the light discharge tube and vertical to the X-axis. The first reflecting part includes first curved parts formed on an opposite side of the light discharge tube from the opening, planar parts connected to the first curved parts and disposed closer to the opening than the first curved parts, and circular parts connected to the planar parts and disposed closer to the opening than the planar parts, and the second reflecting part includes second curved parts connected to the circular parts of the first reflecting parts and disposed closer to the opening than the first reflecting part.

The first curved parts may have an elliptic profile characterized by $-1<K<0$, a parabolic profile characterized by $K=-1$, or a transformed aspheric profile characterized by $K<-1$ or $K>0$, where K is a conic constant. The planar parts may be connected to the first curved part and the planar parts linearly extend to points on the Y-axis, wherein the points on the Y-axis are located to almost contact the outer surface of the light discharge tube or to be located slightly further from the surface of the light discharge tube. The center of a circle on which the circular parts are based may coincide with the center of the light discharge tube. The second curved parts may have an elliptic profile or a parabolic profile and a focus of the elliptic profile or the parabolic profile that substantially coincides with the center of the light discharge tube. Subsequently, since an exposure angle light directly irradiated to a subject from the center of the light discharge tube is formed almost the same as an exposure angle of reflected light reflected at the first reflecting parts and the second reflecting part and then, irradiated to a subject, light loss can be prevented and thus, light distribution is improved.

Connection points where the first reflecting part and the second reflecting part meet, may be disposed closer to the side of the opening from the Y-axis. Accordingly, an opening width can be reduced and thus, the invention provides an electronic stroboscope and a camera using the electronic stroboscope which is more compact.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

An electronic stroboscope according to an embodiment of the present invention includes a light discharge tube and a reflector. A side cross section of the light discharge tube having a circular shape and a light source (not illustrated) is disposed in the light discharge tube. An X-axis extends from the center of the light discharge tube to the side of an opening of the light discharge tube as viewed in a side cross section of the light discharge tube and a Y-axis passes through the center of the light discharge tube perpendicular to the X-axis. An angle of light distribution and a light distribution efficiency of light generated from the light source and radiated in a radial direction of the electronic stroboscope may be affected by shape of the reflector as viewed in the side cross section of the light discharge tube, while the shape of the light discharge tube as viewed in a longitudinal cross section only affects light distribution efficiency in a longitudinal direction of the electronic stroboscope.

Figure 1:
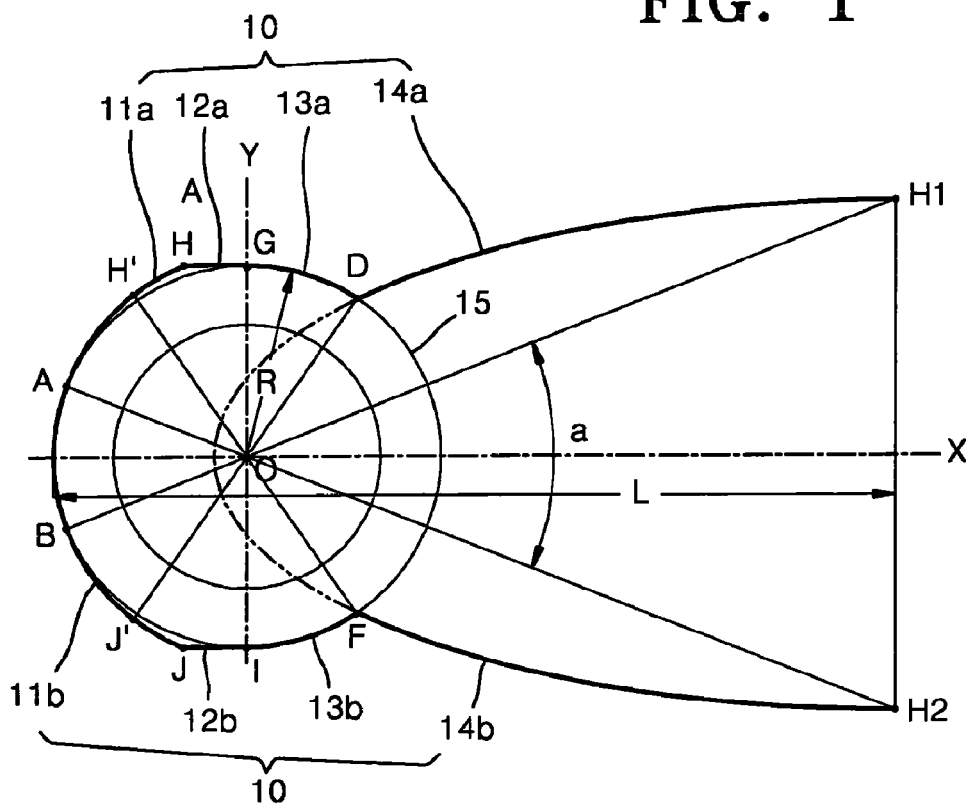
FIG. 1 is a side cross-sectional view of a light discharge tube and a reflector of an electronic stroboscope according to an embodiment of the present invention.

FIG. 1 is a side cross-sectional view of a light discharge tube 15 and a reflector 10 of an electronic stroboscope according to an embodiment of the present invention.

Referring to FIG. 1, the light discharge tube 15 is enclosed by the reflector 10, wherein the light discharge tube 15 is generally cylindrical. As illustrated, an X-axis extends from the center of the light discharge tube to the side of the opening, and a Y-axis passes through the center of the light discharge tube perpendicular to the X-axis. Perpendicular to the X-axis and the Y-axis is a Z-axis that extends along the axis of the generally cylindrical discharge tube 15. The reflector 10 is formed of first reflecting parts 11, 12, and 13 and a second reflecting part 14. The reflector 10 reflects light to exit through the second reflecting part 14 or the opening of the reflector 10. The first reflecting parts 11, 12, and 13 are divided into first curved parts 11a and 11b, planar parts 12a and 12b, and circular parts 13a and 13b and are spaced approximately 0.01 mm apart from the external diameter of the light discharge tube 15. The second reflecting part 14 is formed of second curved parts 14a and 14b. The second curved parts 14a and 14b reflect light directly radiated from the light discharge tube 15 or reflected from the first reflecting parts 11, 12, and 13 toward the opening.

Here, the first curved parts 11a and 11b are formed to have a generally aspherical shape (H~J), for example, an ellipse satisfying $-1<K<0$ (K: conic constant), a parabola satisfying $K=-1$, or a transformed aspheric satisfying $K<-1$ or $K>0$.

In the embodiment illustrated in FIG. 1, the first curved parts 11a and 11b form an ellipse. A point of the first curved parts 11a and 11b located on the X-axis may be disposed close to the discharge tube 15, such as about 0.01 mm away the outer surface of the light discharge tube 15 located on the X-axis. In other words, the first curved parts 11a and 11b nearly contact the outer surface of the light discharge tube 15. Therefore, the center of the light discharge tube 15 on the X-axis is disposed so that the outer surface of the light discharge tube 15 nearly contacts with the first curved parts 11a and 11b of the reflector.

The planar parts 12a and 12b are connected to the first curved parts 11a and 11b and are disposed closer to the opening (D~F) than the first curved parts 11a and 11b. In more detail, the planar parts 12a and 12b extend linearly from the points H and J, which meet the first curved parts 11a and 11b, towards points G and I, respectively, in a direction towards the X-axis, wherein the points G and I are spaced apart from the points where the Y-axis intersects the outer surface of the light discharge tube 15. Here, a direction in which the planar parts 12a and 12b extend may be substantially parallel to the X-axis or inclined slightly towards the X-axis (because he distance between H and J may be slightly greater than the distance between G and I). The planar parts 12a and 12b are formed above the upper part and below the lower part of the light discharge tube 15, respectively. In FIG. 1, the points G and I of the planar parts 12a and 12b are illustrated and described as spaced about 0.01 mm apart from the points where the Y-axis intersects the outer surface of the light discharge tube 15, but the invention is not limited to such spacing, which may be closer or further.

The circular parts 13a and 13b are a part of a circle which is substantially centered on the Z-axis, the center of the light discharge tube 15. The circular parts 13a and 13b are connected to the planar parts 12a and 12b and are disposed closer to the opening (D~F) than the circular parts 13a and 13b. In more detail, the center of the circle of which the circular parts 13a and 13b are formed on coincides with the center of the light discharge tube 15, O, and the circular parts 13a and 13b are formed in a circular arc shape from the points G and I. The circular parts 13a and 13b are formed above the upper part and below the lower part of the light discharge tube 15, respectively.

The second curved parts 14a and 14b, which forms the second reflecting part 14, are connected to the circular parts 13a and 13b and are disposed closer to the opening (H1~H2) than the circular parts 13a and 13b. The second curved parts 14a and 14b are generally elliptical or parabolic. The second curved parts 14a and 14b are disposed so that a focus of the ellipse or the parabola coincides or nearly coincides with the center of the light discharge tube 15, O. The vertical distance between each right end of the second curved parts 14a and 14b is defined as the opening width (H1~H2) of the reflector and the distance along the X-axis from the opening to the point of the first curved parts 11a and 11b that intersects the X-axis is defined as the depth, L of the reflector. The angle between lines formed from the center of the light discharge tube 15 to the upper and lower part of the second curved parts 14a and 14b, respectively is a maximum angle of light distribution, a.

Based on such structure described above, in the reflector 10 according to the current embodiment of the present invention, connection points D and F, where the first reflecting parts 11, 12, and 13 and the second reflecting part 14 meet, are disposed closer to the side of the opening of the reflector from the Y-axis. In other words, the circular parts 13A and 13B are disposed on the side of the opening (H1~H2) and thus, the opening width (H1~H2) can be reduced. Therefore, the electronic stroboscope of the present invention is more compact and thus may be used to further miniaturize of a camera. At the same time, light radiated from the light discharge tube 15 towards the circular parts 13a and 13b and reflected from the circular parts 13a and 13b is reflected so that the light is concentrated in the range of the angle of light distribution, thereby improving the light distribution efficiency. This will be described in more detail later.

Lines (DOJ', FOH') extending from the points D and F pass through the center of the light discharge tube 15, O, to the first curved parts 11a and 11b, H'and J', respectively. The connection points D and F are the points where the first reflecting parts 11, 12, and 13 and the second reflecting part 14 meet.

Figure 2:
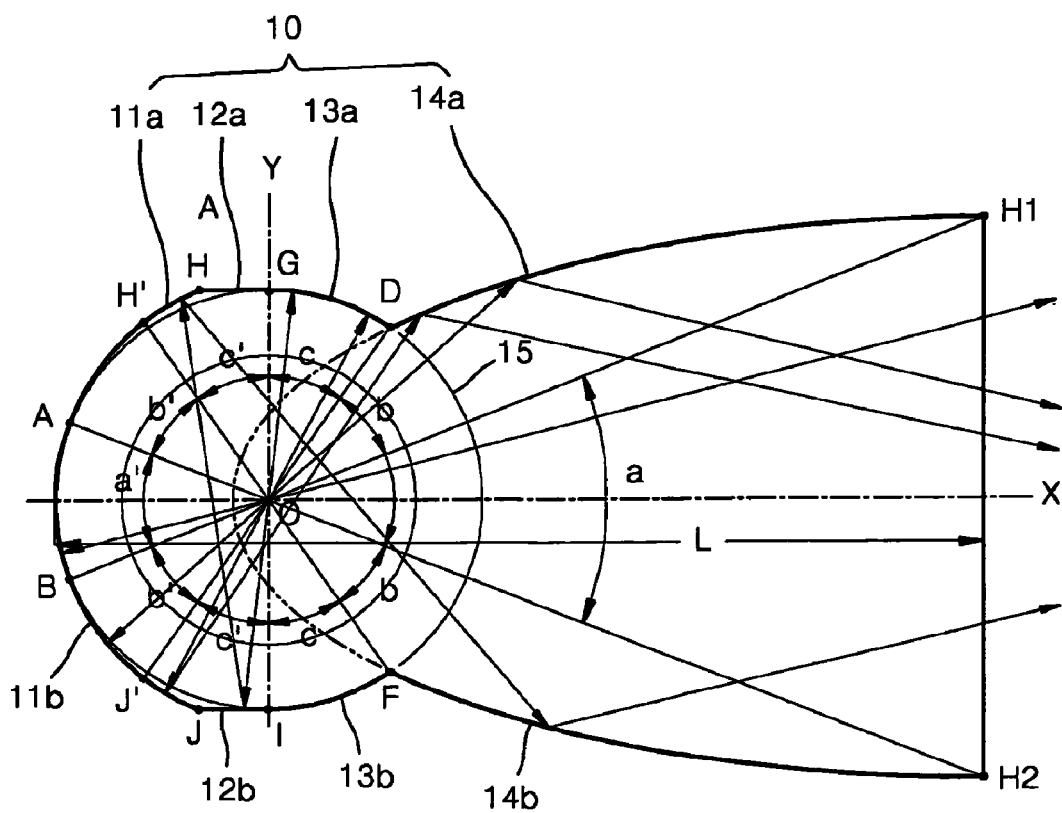
FIG. 2 is a side cross-sectional view illustrating light paths in the reflector of FIG. 1.

FIG. 2 is a side cross sectional view illustrating light paths in the reflector 10 of FIG. 1.

Referring to FIG. 2, light paths in the electronic stroboscope according to an embodiment of the present invention will be now described.

The light source disposed in the light discharge tube 15 radiates light over 360 degrees as viewed in the side cross section thereof. First, light radiating in the range of the angle of light distribution exits out of the opening without being reflected by the first reflecting parts 11, 12, and 13 or second reflecting part 14 and is irradiated directly to a subject (not illustrated). Light radiating in the range of the angle a light distribution a' first reflects at the first curved parts 11a and 11b included in the first reflecting parts. Here, most light is reflected almost along the same path to exit out the opening and to directly irradiate to a subject. Then, a significantly small amount of light secondarily reflects at the second reflecting part 14 and exits out of the opening to irradiate to a subject. Light radiating in the range of the angle of light distribution b first reflects at the second reflecting part 14 and is concentrated at or near a point of the opening (H1~H2) near the X-axis. The reason is that since the center of the light discharge tube, O is disposed on or near a first focus of an ellipse on which the shape of the second reflecting part 14 is based on, and a second focus of the elliptical surface is located on a point a short distance from the opening, light radiated from the first focus of an ellipse and reflected by the second reflecting part 14 passes through the second focus based on the principles of an ellipse. Here, an angle of light distribution of light concentrated is almost same as the angle of light distribution a. After light concentration, light is irradiated to a subject with the similar distribution with light radiating in the angle of light distribution a. Light radiated in the range of the angle of light distribution b' towards the first curved part 11b first reflects at the first curved part 11b included in the first curved reflecting part and then, secondly reflects at the second reflecting part 14a, and then exits the opening and irradiates a subject.

Light radiated in the range of angle c towards the circular part 13a first reflects at the circular part 13a towards the path of incidence due to the properties of a circle. Then, some of the light secondly reflects at the planar part 12b, thirdly reflects at the first curved part 11a, fourthly reflects at the second reflecting part 14b, and exits out of the opening to irradiate to a subject. The rest of the light secondly reflects at the first curved part 11b, thirdly reflects at the second reflecting part 14a and then, exits out of the opening to irradiate to a subject.

Light radiated in the range of angle c' towards the planar part 12b secondly reflects at the first curved part 11a, thirdly reflects at the second reflecting part 14b and then, most light directly exits out of the opening to irradiate to a subject. Here, if the planar part 12a and 12b where not planar but circular in shape with a center at O and radius is R, light radiated in the angle c' is kept between spherical surfaces facing each other and repeatedly reflects causing internal reflection based on the principles of a circle, resulting in loss of light that is used. In this case, when angle GOH is 30 degrees, 1/6(=30*2/360) of the total light radiated by the light discharge tube 15 is internally reflected and thus, approximately 17% of light loss occurs.

In the current embodiment of the present invention, light reflected from the circular parts 13a and 13b is reflected again at the planar parts 12a and 12b enabling the light to be transmitted to the second reflecting parts 14a and 14b. In other words, an angle of light directly irradiated towards a subject from the center of the light discharge tube O is almost the same as an, angle of reflected light reflected at the first reflecting parts 11, 12, and 13 and the second reflecting part 14 and then, irradiated to a subject. Therefore, the circular parts 13a and 13b are added to reduce the opening width while at the same time reduce light loss. In the present invention, the opening width is reduced while light distribution is maintained, which allows the electronic stroboscope to be more compact. In addition, even though a light discharge tube 15 having a relatively short diameter is used, the of light distribution is excellent and thus, the electronic stroboscope is more slim in shape. Moreover, the reflector according to the current embodiment of the present invention has 3 pairs of inflection points (H and J, G and I, and D and F), which is less than conventional reflectors, making the reflector of the invention easier to manufacture. In addition, light loss at the reflecting surface around the inflection points of the reflector of the invention is reduced.

Figure 3:
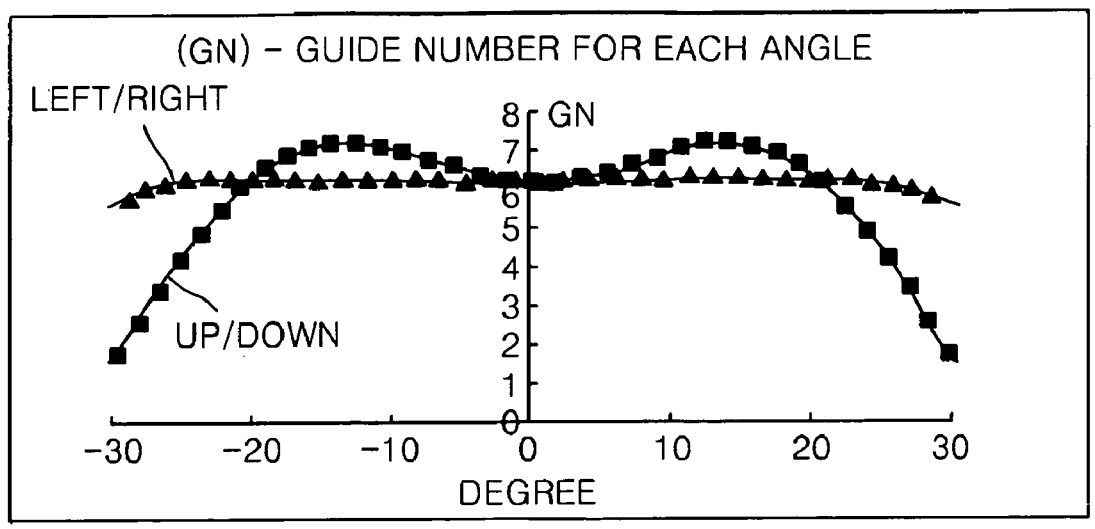
FIG. 3 is a graph showing the result of a simulation in which guide numbers for a range of light emission angles of the reflector in the electronic stroboscope of FIG. 1 are illustrated.
Figure 4:
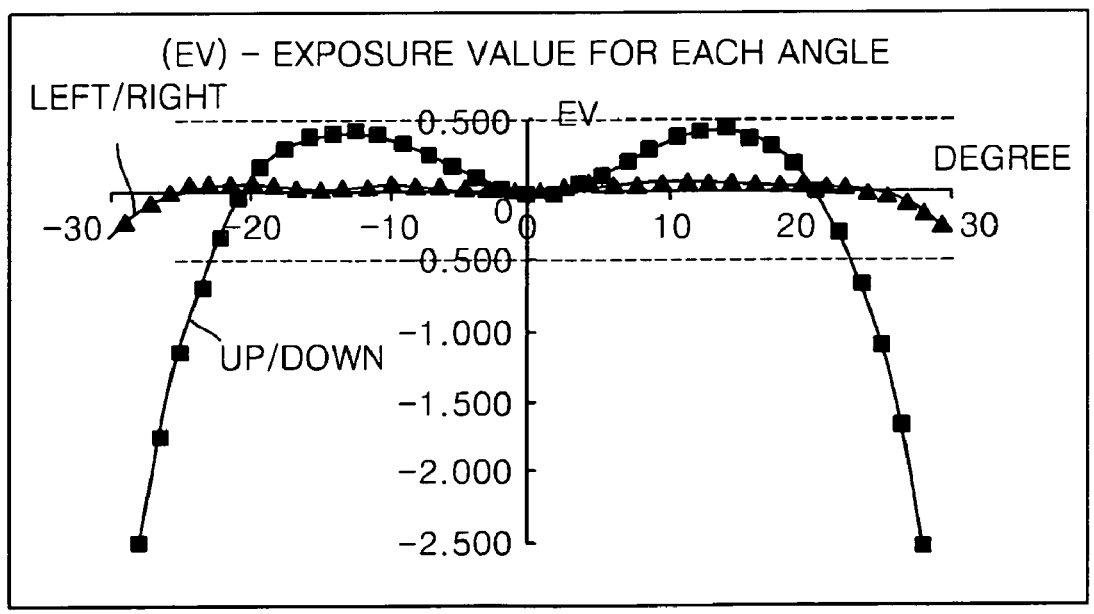
FIG. 4 is a graph showing the result of a simulation in which exposure values for a range of light emission angles of the reflector in the electronic stroboscope of FIG. 1 are illustrated.

FIG. 3 is a graph showing the result of a simulation in which guide numbers for each angle of the reflector 10 in the electronic stroboscope of FIG. 1 are illustrated and FIG. 4 is a graph showing the result of a simulation in which exposure values for each angle of the reflector 10 in the electronic stroboscope of FIG. 1 are illustrated.

A condenser used in the simulation had a capacity of 100 μF, and a charging voltage of 305 V; the diameter of the emitting light source was 1.8 mm and an arc length of 12 mm; and a measuring distance was 3 m.

In FIGS. 3 and 4, an angle refers to an angle of light distribution and guide numbers are proportional to light intensity. When the guide numbers are large and uniform, the light distribution is improved.

Referring to FIG. 3, in the electronic stroboscope according to an embodiment of the present invention, the guide number is relatively large and uniform over a wide range of angles of light distribution in a longitudinal direction of the electronic stroboscope. Also, the light distribution is excellent over an angle of light distribution of 20 degrees in a vertical direction of the electronic stroboscope.

Referring to FIG. 4, exposure values for each angle indicates the difference between the guide number at a center angle (when the angle of light distribution is 0 degrees) and the guide number at an outer angle. In other words, the exposure value is a ratio of the guide number at the center angle to the guide number at the circumference angle. FIG. 4 illustrates that exposure values for each angle are relatively uniform over a wide range of angles of light distribution in the longitudinal direction and is in the range of about 0.5 over an angle of 20 degrees in the vertical direction.

Figure 5:
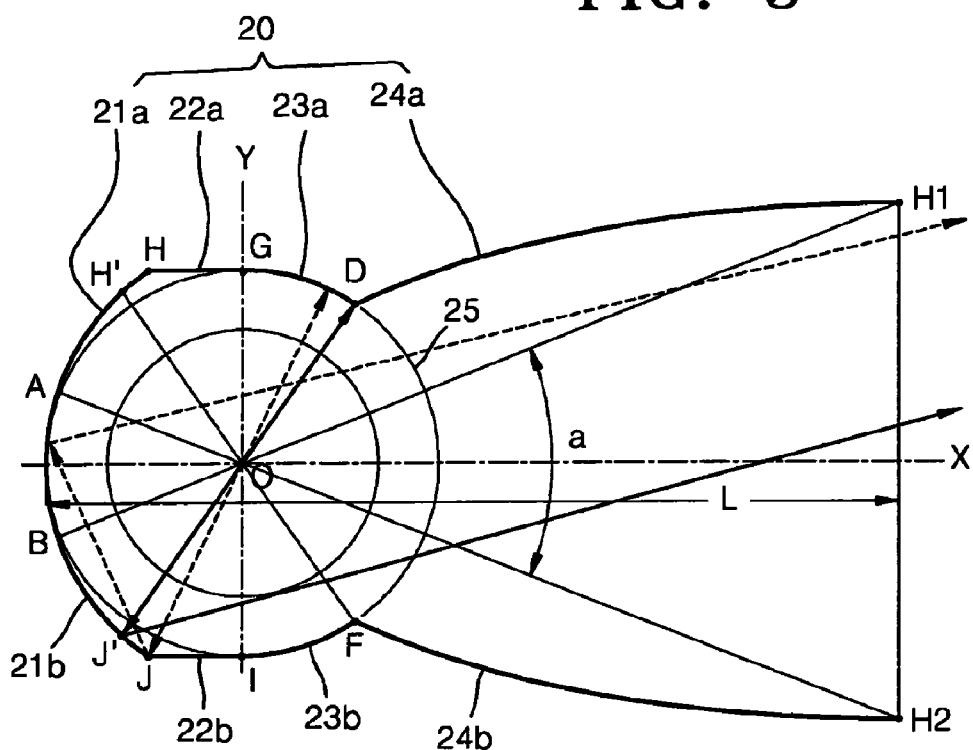
FIG. 5 is a side cross-sectional view of a light discharge tube and a reflector of an electronic stroboscope according to another embodiment of the present invention.

FIG. 5 is a side cross sectional view of a light discharge tube and a reflector of an electronic stroboscope according to another embodiment of the present invention.

The difference of the electronic stroboscope according to the current embodiment of the present invention with the previous embodiment is that first curved parts 21a and 21b are parabolic (K=−1), instead of elliptical, and thus, planar parts 22a and 22b are longer. The other elements of the embodiment of FIG. 5 are substantially the same as the embodiment illustrated in FIG. 1. As illustrated by solid lines in FIG. 5, light radiated from the light source of the electronic stroboscope towards a connection point D of a circular part 23a and a second curved part 24a is first reflected at the connection point D towards J' of the first curved part 21b and is reflected towards and exits out of the opening. In addition, as illustrated by a dotted line, light radiated from the light source towards the left of the connection point D, where a circular part 23a and the second curved part 24a meet, is first reflected at a circular part 23a, is secondly reflected at a connection point J, where the first curved part 21b and the planar part 22b meet, and is thirdly reflected at the first curved part 21a towards and exits out of the opening. Light radiated to the circular part 23a and 23b is reflected at the first reflecting part and concentrated within a maximum angle of light distribution a, and thus, light concentration is improved, thereby improving light distribution properties.

Figure 6:
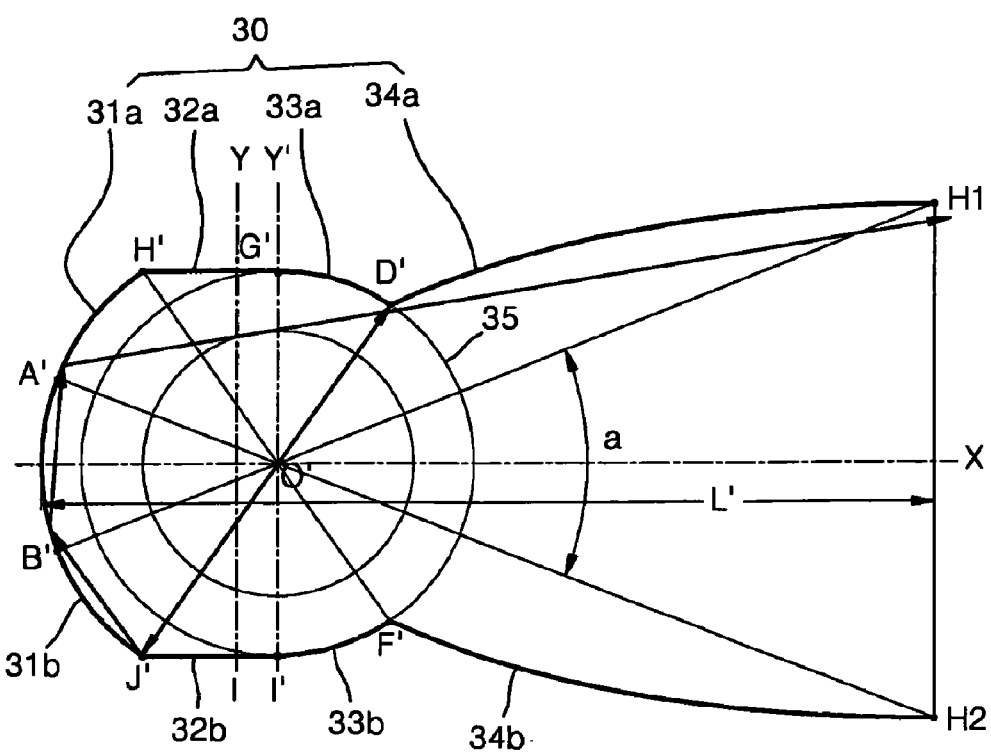
FIG. 6 is a side cross-sectional view of a light discharge tube and a reflector of an electronic stroboscope according to still another embodiment of the present invention.

FIG. 6 is a side cross sectional view of a light discharge tube and a reflector of an electronic stroboscope according to another embodiment of the present invention.

The difference of the electronic stroboscope according to current embodiment of the present invention with the embodiment of FIG. 5 is that the light discharge tube 35 is disposed substantially closer to the opening and the outer surface of the light discharge tube 35 is further away from first curved parts 31a and 31b. Since the center of the light discharge tube 35, O' is moved to closer to the opening, the line D'O'J' connecting with the point D', where the circular part 33a and a second reflecting part 34a meet; and the center of the light discharge tube 35, O' can be passed through the end part of the first curved part 31b. As a result, the length of the planar part 32a and 32b is increased by the distance from Y to Y' along the X-axis, which represents to distance the light discharge tube 35, is moved on the X-axis toward the opening. However, the present invention is not limited thereto and the distance spaced apart from the center of the light discharge tube 35, O' can differ. Here, the distance should not increase the depth, L' of the reflector 30. The other elements of the embodiment of FIG. 6 are substantially the same as the embodiment of FIG. 1.

As illustrated by solid lines in FIG. 5, light radiated from the light source of the electronic stroboscope towards a connection point D of a circular part 33a and a second curved part 34a is first reflected at the connection point D, is secondly reflected at the connection point J' of the first curved part 31b and the planar part 32b, is thirdly and fourthly reflected at the first curved part 31b and exits out of an opening.

Light radiated to the circular part 33a and 33b is reflected at the first reflecting part and concentrated within a maximum angle of light distribution a, and thus, light concentration is improved, thereby improving light distribution properties.

As described above, the first reflecting part in the electronic stroboscope according to an embodiment of the present invention includes the circular parts disposed closer to a part of the first reflecting part on the side of the opening than a part of the first reflecting part on the other side of the light discharge tube to the side having the opening and thus, an opening width can be reduced. Therefore, an electronic stroboscope and a camera using the electronic stroboscope according to an embodiment of the present invention can be more compact.

In addition, since an exposure angle by direct light directly irradiated to a subject from the center of the light discharge tube is formed almost the same as an exposure angle of reflected light reflected at the first reflecting part and the second reflecting part and then, irradiated to a subject, light loss can be prevented and thus, a property of light distribution can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electronic stroboscope comprising:
   a light discharge tube radiating light in substantially all directions from an outer surface thereof; and
   a reflector in which the light discharge tube is disposed, the reflector comprising a first reflecting part that reflects light radiated from the light discharge tube and a second reflecting part that reflects light directly radiated from the light discharge tube and light reflected from the first reflecting part to exit out of an opening of the reflector, wherein:
   an X-axis is defined as an axis extending parallel to the opening from the center of the light discharge tube as viewed in a side cross-section including the light discharge tube and the reflector, the first reflecting part includes first curved parts formed on an opposite side of the light discharge tube from the opening, planar parts connected to the first curved parts and disposed closer to the opening than the first curved parts, and circular parts connected to the planar parts and disposed closer to the opening than the planar parts, and the second reflecting part includes second curved parts connected to the circular parts of the first reflecting parts and disposed closer to the opening than the first curved parts, wherein only one planar part is disposed between each first curved part and each circular part;
   the center of a circle on which the circular parts are based substantially coincides with the center of the light discharge tube; and
   lines extending from the connection points where the circular parts and the second reflecting parts meet and passing through the center of the light discharge tube intersect with portions between both endpoints of the first curved parts.

2. The electronic stroboscope of claim 1, wherein the first curved parts have a generally elliptic profile characterized by −1<K<0, where K is a conic constant.

3. The electronic stroboscope of claim 1, wherein the first curved parts have a generally parabolic profile characterized by K=−1, where K is a conic constant.

4. The electronic stroboscope of claim 1, wherein the first curved parts have a generally transformed aspheric profile characterized by K<−1 or K>0, where K is a conic constant.

5. The electronic stroboscope of claim 1, wherein the light discharge tube is elongated and has an axis which is generally orthogonal to the X-axis, and wherein a Y-axis is defined as an axis passing through the center of the light discharge tube and orthogonal to the X-axis and the axis of the light discharge tube, and wherein the planar parts are connected to the first curved part and the planar parts linearly extend to points on the Y-axis, wherein the points on Y-axis are located to almost contact the outer surface of the light discharge tube or to be located slightly further from the surface of the light discharge tube.

6. The electronic stroboscope of claim 5, wherein the planar parts are substantially parallel to the X-axis.

7. The electronic stroboscope of claim 5, wherein the planar parts are inclined by a predetermined angle with respect to the X-axis.

8. The electronic stroboscope of claim 1, wherein the second curved parts have an elliptic profile or a parabolic profile and a focus of the elliptic profile or the parabolic profile substantially coincides with the center of the light discharge tube.

9. The electronic stroboscope of claim 1, wherein the light discharge tube is elongated and has an axis which is generally orthogonal to the X-axis, and wherein a Y-axis is defined as an axis passing through the center of the light discharge tube and orthogonal to the X-axis and the axis of the light discharge tube, and wherein connection points where the first reflecting part and the second reflecting part meet, are disposed closer to the side of the opening from Y-axis.

10. The electronic stroboscope of claim 1, wherein the light discharge tube is elongated and has an axis which is generally orthogonal to the X-axis, and wherein a Y-axis is defined as an axis passing through the center of the light discharge tube and orthogonal to the X-axis and the axis of the light discharge tube, and wherein connection points where the planar parts and the circular parts meet, are located on the Y-axis.

11. The electronic stroboscope of claim 1, wherein the center of the light discharge tube is located on the X-axis so that the outer surface of the light discharge tube nearly contacts with the first curved parts on the X-axis.

12. An electronic stroboscope comprising:
a light discharge tube radiating light in substantially all directions from an outer surface thereof; and
a reflector in which the light discharge tube is disposed, the reflector comprising a first reflecting part that reflects light radiated from the light discharge tube and a second reflecting part that reflects light directly radiated from the light discharge tube and light reflected from the first reflecting part to exit out of an opening of the reflector,
wherein:
an X-axis is defined as an axis extending parallel to the opening from the center of the light discharge tube as viewed in a side cross-section including the light discharge tube and the reflector, the first reflecting part includes first curved parts formed on an opposite side of the light discharge tube from the opening, planar parts connected to the first curved parts and disposed closer to the opening than the first curved parts, and circular parts connected to the planar parts and disposed closer to the opening than the planar parts, and the second reflecting part includes second curved parts connected to the circular parts of the first reflecting parts and disposed closer to the opening than the first curved parts, wherein only one planar part is disposed between each first curved part and each circular part;
the center of the light discharge tube is disposed on the X-axis so that the outer surface of the light discharge tube is spaced apart toward the opening from the curved parts on the X-axis; and
lines extending from the connection points where the circular parts and the second reflecting parts meet and passing through the center of the light discharge tube intersect with an end part of the first curved parts.

13. An electronic stroboscope comprising:
a light discharge tube that radiates light in substantially all directions; and
a reflector in which the light discharge tube is disposed, the reflector defines an opening for the exit of light radiated from the light discharge tube and light reflected from the reflector, the reflector is substantially symmetric about a plane extending through a central axis of the light discharge tube and which bisects the opening, said reflector comprised of, sequentially, on each symmetric side of the plane extending from the back of the reflector to the opening, a first curved part, a planar part, a generally circular part and a second curved part, wherein the first curved part is attached to a first end of the planar part and the circular part is attached to a second end of the planar part;
wherein:
the center of a circle on which the circular parts are based substantially coincides with the center of the light discharge tube; and
lines extending from the connection points where the circular parts and the second reflecting parts meet and passing through the center of the light discharge tube intersect with portions between both end points of the first curved parts.

14. The electronic stroboscope of claim 13 wherein the first curved part has a profile selected from the group consisting of generally elliptic, generally parabolic and a generally transformed aspheric profile.

15. The electronic stroboscope of claim 13 wherein the second curved part has a focus that substantially coincides with the center of the light discharge tube, and has profile selected from the group consisting of a generally elliptic profile and a generally parabolic profile.

16. The electronic stroboscope of claim 13 wherein the planar part is substantially parallel to the plane.

17. The electronic stroboscope of claim 13 wherein the planar part is inclined with respect to the plane.

* * * * *